United States Patent
Simske et al.

(10) Patent No.: US 8,818,047 B2
(45) Date of Patent: Aug. 26, 2014

(54) GENERATION OF AN INDIVIDUAL GLYPH, AND SYSTEM AND METHOD FOR INSPECTING INDIVIDUAL GLYPHS

(75) Inventors: Steven J. Simske, Fort Collins, CO (US); Guy de Warrenne Bruce Adams, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 13/259,139

(22) PCT Filed: May 21, 2009

(86) PCT No.: PCT/US2009/044853
§ 371 (c)(1),
(2), (4) Date: Sep. 22, 2011

(87) PCT Pub. No.: WO2010/134919
PCT Pub. Date: Nov. 25, 2010

(65) Prior Publication Data
US 2012/0051601 A1 Mar. 1, 2012

(51) Int. Cl.
*G06K 9/00* (2006.01)
*H04N 1/00* (2006.01)
*G07D 7/20* (2006.01)
*G06K 9/18* (2006.01)

(52) U.S. Cl.
CPC ....... *H04N 1/00334* (2013.01); *H04N 1/00331* (2013.01); *H04N 1/00326* (2013.01); *G07D 7/2025* (2013.01); *G06K 9/18* (2013.01)
USPC ........... 382/112; 382/181; 382/183; 382/190; 382/200; 382/203

(58) Field of Classification Search
USPC ................................................. 382/100–112
See application file for complete search history.

(56) References Cited

U.S. PATENT DOCUMENTS 5,883,986 A * 3/1999 Kopec et al. ................... 382/310
5,901,224 A * 5/1999 Hecht ............................ 713/179
(Continued)

FOREIGN PATENT DOCUMENTS

JP 05242294 A 9/1993
JP 09062778 A 3/1997
(Continued)

OTHER PUBLICATIONS

Wei Deng, Printer Identification Based on Distance Transform, IEEE 2008.*

(Continued)

*Primary Examiner* — Jayesh A Patel
*Assistant Examiner* — Iman K Kholdebarin (57) ABSTRACT

A method for generating individual glyphs, and a system and method for inspecting individual glyphs are disclosed. The system includes a true resolution imaging device configured to capture an image of a printed glyph. A registry service has a database for storing other glyphs and/or parameters of other glyphs. An analysis system, in selective communication with the registry service, includes computer software configured to receive the captured image; an image analysis program configured to perform forensic analysis on the received image to determine parameter(s) associated with the glyph; and an image comparison program configured to i) compare the glyph parameter(s) with parameters stored in the registry for other glyphs or with parameters determined, by image analysis program, for the other glyphs stored in the registry, and ii) generate a probability that the glyph and object are authentic based upon the comparison.

16 Claims, 4 Drawing Sheets

(56) References Cited

U.S. PATENT DOCUMENTS

| | | | |
|---|---|---|---|
| 6,341,730 B1* | 1/2002 | Petrie | 235/494 |
| 6,419,162 B1* | 7/2002 | Petrie et al. | 235/494 |
| 6,641,051 B1* | 11/2003 | Illowsky et al. | 235/494 |
| 6,671,397 B1* | 12/2003 | Mahon et al. | 382/145 |
| 6,819,776 B2* | 11/2004 | Chang | 382/100 |
| 6,871,789 B2* | 3/2005 | Hilton et al. | 235/494 |
| 7,028,188 B1 | 4/2006 | Moore | |
| 7,046,829 B2* | 5/2006 | Udupa et al. | 382/124 |
| 7,106,905 B2* | 9/2006 | Simske | 382/229 |
| 7,583,267 B2* | 9/2009 | Stamm et al. | 345/472 |
| 7,630,552 B2* | 12/2009 | Houle et al. | 382/182 |
| 7,657,091 B2* | 2/2010 | Postnikov et al. | 382/178 |
| 7,676,038 B2* | 3/2010 | Simske et al. | 380/55 |
| 7,830,557 B2* | 11/2010 | Simske et al. | 358/3.28 |
| 7,878,549 B2* | 2/2011 | Simske et al. | 283/17 |
| 7,916,863 B2* | 3/2011 | Simske et al. | 380/55 |
| 8,184,867 B2* | 5/2012 | Otto et al. | 382/117 |
| 2002/0018593 A1* | 2/2002 | Oohmura et al. | 382/173 |
| 2003/0052171 A1* | 3/2003 | Gyllenskog | 235/462.25 |
| 2003/0156733 A1* | 8/2003 | Zeller et al. | 382/100 |
| 2004/0078333 A1* | 4/2004 | Hilton et al. | 705/45 |
| 2005/0008216 A1* | 1/2005 | Smith et al. | 382/141 |
| 2006/0036566 A1* | 2/2006 | Simske et al. | 707/1 |
| 2006/0036614 A1* | 2/2006 | Simske et al. | 707/100 |
| 2006/0036649 A1* | 2/2006 | Simske et al. | 707/200 |
| 2006/0061088 A1* | 3/2006 | Harrington et al. | 283/51 |
| 2006/0244988 A1* | 11/2006 | Oishi | 358/1.13 |
| 2006/0293891 A1* | 12/2006 | Pathuel | 704/246 |
| 2008/0006615 A1* | 1/2008 | Rosario et al. | 219/121.68 |
| 2008/0304110 A1* | 12/2008 | Simske et al. | 358/3.28 |
| 2009/0144799 A1* | 6/2009 | Simske | 726/1 |
| 2011/0068181 A1* | 3/2011 | Simske et al. | 235/492 |
| 2011/0116681 A1* | 5/2011 | Simske et al. | 382/100 |
| 2011/0170145 A1* | 7/2011 | Govyadinov et al. | 358/3.28 |
| 2011/0310404 A1* | 12/2011 | Simske et al. | 358/1.2 |
| 2011/0310441 A1* | 12/2011 | Simske et al. | 358/3.28 |
| 2012/0051601 A1* | 3/2012 | Simske et al. | 382/112 |
| 2012/0212324 A1* | 8/2012 | Pollard et al. | 340/5.86 |
| 2012/0269427 A1* | 10/2012 | Simske et al. | 382/162 |
| 2012/0280029 A1* | 11/2012 | Simske et al. | 235/375 |
| 2012/0286028 A1* | 11/2012 | Simske et al. | 235/375 |
| 2013/0114113 A1* | 5/2013 | Simske et al. | 358/3.28 |

FOREIGN PATENT DOCUMENTS

| | | | | |
|---|---|---|---|---|
| JP | 09130612 A | 5/1997 | | |
| KR | 1020080022854 | 3/2008 | | |
| WO | WO 2009142635 A1 * | 11/2009 | | G06K 19/067 |
| WO | WO 2010134919 A1 * | 11/2010 | | |

OTHER PUBLICATIONS

International Search Report and Written Opinion for PCT/US2009/044853 dated Dec. 30, 2009 (10 pages).

Simske, S., et al., "The Image Based Forensic Service for Product Authentication", HP Tech Con 2008, 10 pages.

Adams, G., et al., "Adding Robust Anti-Counterfeiting to 2D Barcodes", HP Tech Con 2008, 3 pages.

Ingenia Technology, http://www.ingeniatechnology.com/technology.php, last accessed Oct. 28, 2008 and May 29, 2009.

Cortegra, "Biometric Authentication Technology," http://www.cortegra.com/ba-biometric_authentication.html, last accessed Oct. 28, 2008 and May 29, 2009.

Khanna et al: "A survey of forensic characterization methods for physical devices", Digital Investigation, Elsevier, Amsterdam, NL, vol. 3, Sep. 1, 2006, pp. 17-28.

Mikkilineni, Aravind et al, "Printer forensics using SVM techniques: Proceedings of the IS&T's NIP21" Int'l Conf on Digital Pronting Technologies, Sep. 30, 2005, pp. 1-4.

Schulze, Christian et al, "Evaluation of Graylevel-Features for Printing Technique Classification in High-Throughput Document Management Systems", Aug. 7, 2008,pp. 35-46.

Wei Deng et al: "Printer Identification Based on Distance Transform", Intelligent Networks and Intelligent Systems, 2008. ICINIS '08. First Int'l Workshop on, IEEE, Nov. 2008 pp. 565-568.

* cited by examiner

GENERATION OF AN INDIVIDUAL GLYPH, AND SYSTEM AND METHOD FOR INSPECTING INDIVIDUAL GLYPHS

BACKGROUND

The present disclosure relates generally to individual glyphs, and more particularly to an individual glyph generation method, and to an individual glyph inspection method and system.

Security printing, publishing, and imaging are important components of product differentiation, tracking and tracing, inspection, authenticating, forensics, as well as other anti-counterfeiting initiatives. Security printing involves providing each package with a unique ID, in the form of, for example, a smart label, deterrent or mark. Such unique identifiers may be overt and/or covert, and may contain authenticable data. Thus, such marks are particularly suitable for product track and trace, inspection, and authentication. Image based forensic services have been used to detect and aggregate counterfeits in a supply chain. Such services are particularly useful when products do not contain specific security deterrents. In particular, such services analyze printing that has occurred on the product in order to investigate the authenticity.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiments of the system and methods disclosed herein advantageously enable simultaneous object authentication and forensic-level identification. The system and methods utilize a true resolution imaging device, which, when coupled with a custom image analysis system, enables a single printed character to simultaneously provide fiducial marking, inspection information, authentication and forensics. Such characters may be reliably read in the same manner at different times and with different devices.

Figure 1:
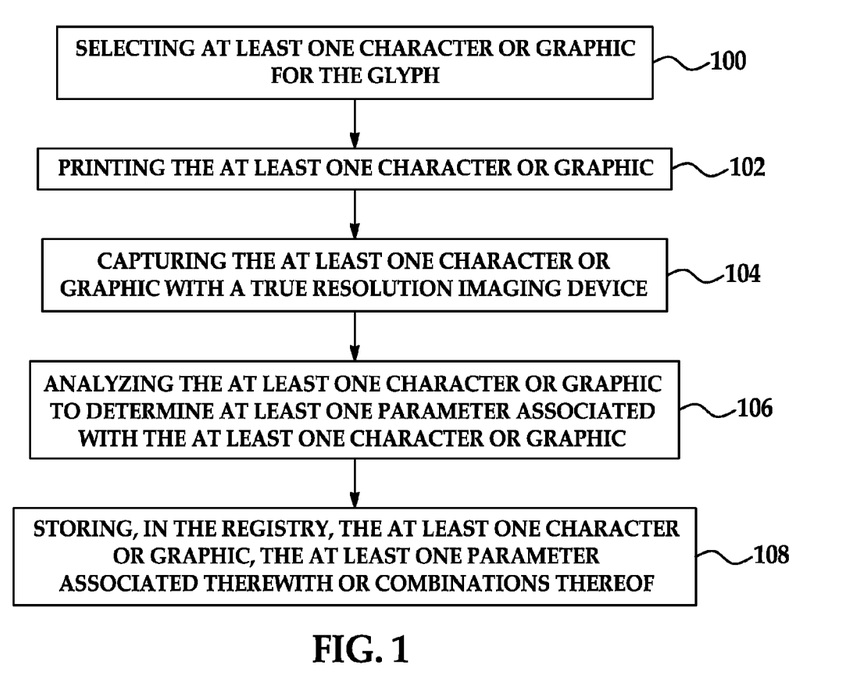
FIG. 1 is a flow diagram depicting an embodiment of an individual glyph generating method.

Referring now to FIG. 1, an embodiment of the individual glyph generating method is depicted. The glyph includes one or more characters (i.e., any alphanumeric character) and/or graphics. The character(s) and/or graphic(s) are selected, as shown at reference numeral 100, and arranged and/or manipulated to form the glyph. It is to be understood that any suitable glyph may be selected or generated. As a non-limiting example, the glyph is a word including multiple characters. The glyph is generated using suitable application(s) capable of creating characters/graphics, such as software based programs, Internet enabled programs, photographic based applications (e.g., copy machines), or the like. Non-limiting examples of such programs include Adobe® Photoshop, Quark® 3D Box Shot, barcode labeling software (e.g., Tattoo ID by ISD®), or other like programs.

Once the glyph is generated, it is printed using a desirable printer, as shown at reference numeral 102. Generally, the printer selected will be one that will be used for deployment of the glyph on an object. Non-limiting examples of suitable printing techniques include inkjet printing (e.g., thermal, piezoelectric, continuous, etc.), laserjet printing (e.g., thermal laserjet), electrophotographic printing, gravure printing, flexographic printing, offset printing, screen printing, dot matrix printing, or any other suitable printing technique that can print the characters/graphics selected or generated for the glyph(s).

One or more of the characters and/or graphics of the printed glyph is/are then captured with a true resolution imaging device, as shown at reference numeral 104. In one embodiment, the entire glyph is captured, and in another embodiment, a character and/or graphic (or portion of a graphic) of interest is captured. It is to be understood that so long as the desired character and/or graphic is in the captured image, and the character and/or graphic is large enough to conceivably vary as a function of angle (e.g., the captured image of a graphic is not a single pixel in size), a portion of the character and/or graphic may be captured and analyzed. In one non-limiting example, a single tile of a 2D barcode may be a sufficient captured image.

The true resolution imaging device described herein includes hardware that is able to capture an image that is overwhelmingly similar to the original image (e.g., the printed glyph). Some suitable example(s) of such an imaging device (and method(s) of using the same) are described in a related patent application PCT/US09/44777 filed concurrently herewith on May 21, 2009, entitled "Imaging a Print Aberration," which application is incorporated by reference herein in its entirety. More particularly, the size of the pixels on the image sensor in the device corresponds to the size of the pixels imaged on the surface of a substrate. In some instances, the true resolution is sufficiently high to resolve substrate/ink interaction features of printed images (described further hereinbelow). The images captured via this device provide forensic evidence (associated with some probability) that is generally not achievable using other imaging devices, such as desktop scanners and mobile cameras. Non-limiting examples of the true resolution imaging device include a 1:1 magnification, 1 to 5 micron true resolution lens-based multi-mega-pixel USB CMOS imaging device (e.g., 1:1 magnification, 3.8 micron true resolution Dyson relay lens-based 3 mega-pixel USB CMOS imaging device), USB microscopes, and iDetector™ (from GSSC), with varying degrees of true resolution. In general, resolving capability is defined by the width of the smallest line that can be successfully read, or by other suitable modulation transfer function methods.

The true resolution imaging device 16 generally includes a self-contained illumination source that affords the capture of individual printed characters and/or graphics with printed parasitics (i.e., anything not intentionally printed, such as satellites (ink droplet tails), or porosity (absorbance of the ink into fibers of the substrate). Furthermore, such devices 16 generally capture a relatively small area (e.g., 5×5 mm) at high resolution to achieve a suitable image. However, it is to be understood that multiple frames or devices 16 may be used simultaneously to crease a much larger image (i.e., in pixels of height or width).

It is to be understood that the glyphs printed and the glyph images captured are not limited to monochrome output. For example, microscopic spatial aberrations (or parasitics) in color may exist in the same way as aberrations exist in a monochrome printing process. Furthermore, in a cyan magenta yellow (CMY) printing process, there may be microscopic variations in the registration or alignment of the color planes.

As shown at reference numeral 106, the captured printed character(s) and/or graphic(s) of the glyph are analyzed to determine at least one parameter associated therewith. It is to be understood that a single character and/or graphic may be analyzed, select characters and/or graphics may be analyzed, or each character and/or graphic making up the glyph may be analyzed. The system used for the analysis includes custom software that performs character/graphic boundary analysis. Boundary analysis may include analysis of the shape, boundary texture, and boundary parasitics of the individual characters and/or graphics.

The analysis may be accomplished via any image analysis technique that is able to account for pixel-to-pixel edges, boundaries, gradients, etc. at full resolution of the image. In one embodiment, shape analysis software or statistically comparable metrics are used for the analysis. Non-limiting examples of such software and metrics include a contrast-insensitive thresholding algorithm to binarize the image; a perimeter-pixel sequence generating algorithm to produce a high-resolution version of a modified Freeman shape code; a small angle-sensitive, shape coding feature set (SCFS) that is sensitive to relative changes in printed glyph radius, parasitics and parasitic complexity; two types of moving average representations of features of the small angle-sensitive shape coding feature set (MA-SCFS); multiple recursive overall shape comparison (ROSC) metrics; and optimal scaling and registration of the glyph image with another image and comparison of such other image.

One or more of the previous metrics may be run on the character(s)/graphic(s) to identify parameters associated with the particular character(s)/graphic(s). The analysis technique(s) selected for computation will depend on the type of glyph/printed mark being analyzed. Furthermore, the parameters identified as a result of the analysis may vary depending, at least in part, upon the glyph itself, the printer used, and the combination of ink and substrate used. The identified parameters may include the shape of the character/graphic, the boundary texture (which includes satellites), porosity, a modified shape descriptor, or combinations thereof. Satellites are unintentional printed marks that appear outside or around the boundary of a character or graphic (see, e.g., FIGS. 3A through 4B), while porosity is unintentional voids inside the printed character or graphic (see, e.g., FIGS. 3A through 4B). A modified shape descriptor includes any anomalies along the perimeter of the character that are classified by a particular shape. Examples of such anomalies include dots that are separated from and are much smaller than the glyph (i.e., "circular" satellites), or ectopic ink dots that are longer, detached or partially attached (i.e., "pseudopod" satellites) that can be further defined by their aspect ratio (length/width ratio), curvature, width variance along the length, etc. The anomalies may be classified according to any desirable system. In one example, certain known anomalies are classified into shapes A through Z (e.g., where A is a dot/circular satellite, B is a 2:1 aspect ratio, consistent-width pseudopod, C is a 3:1 aspect ratio, consistent-width pseudopod, etc.), and the shape descriptor of a character will be any sequence (progression) of shapes along the character perimeter. In a non-limiting example using such a classification system, the shape descriptor of one character may be TUCDEAWO, while the shape descriptor of another character may be TUCFBAWQ. These shape descriptors indicate that the two characters differ by $3/8$ of their shapes.

Figure 2:
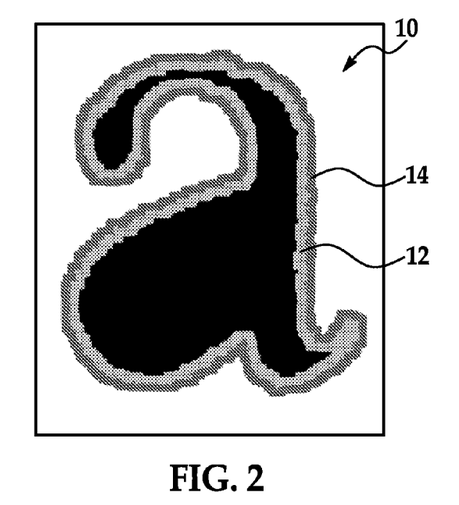
FIG. 2 is a schematic diagram of a character and the areas immediately inside and outside of the character boundary that are analyzed via the individual glyph inspection method disclosed herein.

Referring briefly to FIG. 2, a schematic depiction of the regions 12, 14 of a character 10 that are analyzed during character boundary analysis are depicted. As mentioned hereinabove, the region 12 just inside the character boundary (i.e., within the intended print area) is analyzed for porosity, and the region 14 just outside the character boundary (i.e., outside the intended print area) is analyzed for satellites and/or shape descriptors. The region(s) 12 is/are a predetermined percentage of the character span (i.e., height and width), and can be varied manually or automatically based on the quality (e.g., the satellite-proneness) of the printed glyph. One example method for automating the satellite search width involves using a convex hull for the character and then looking for the width of the expansion zone around the character where the black pixel count drops off precipitously. An example of determining the porosity search width includes auto-determining the character/graphic thickness and then selecting a smaller percentage than such thickness. The character/graphic thickness is the width of an actual printed portion (e.g., see T in FIG. 3A), and such thickness T may be consistent or may vary from one portion of the character/graphic to another.

Since the printer, ink, and substrate used to print the glyphs contribute to the distinctive characteristics/parameters of the character(s) and/or graphic(s) making up the glyphs, the stored characteristics/parameters may be used for comparisons with glyphs that are deployed on various objects (described further hereinbelow). It is to be understood that the generated character(s)/graphic(s) are initially analyzed and stored in order to address various comparison workflows often associated with printed and deployed glyphs. Table 1 below illustrates such comparison workflows. More specifically, during generation and initial analysis of the glyphs, a large number of characters and/or graphics are imaged and analyzed based on the workflows in Table 1 so that the variances can be compared within the same workflow and between different workflows. This enables a multitude of probabilities to be generated for the glyph(s) during the generation stage, so that when a deployed glyph is analyzed, the probability of its authenticity may be determined by comparing it with known, previously analyzed glyphs. Furthermore, the large number of characters and/or glyphs is analyzed during generation so that group variances are known. As shown in Table 1, group variances for glyphs printed using the same print technology and substrate may be different from the group variances for glyphs printed where the print technology, substrate or other measurable parameter (such as those described in Table 1) is changed.

TABLE 1

Comparison Workflows, Statistical Variance and Number of Characters Associated with Such Workflows

| Comparison Workflows | Variance | Number of Different Characters |
|---|---|---|
| One printer versus another; different model | $\sigma^2_{PDM}$ | 2 |
| One printer versus another; same model | $\sigma^2_{PSM}$ | 2 |
| Same printer, same character type, printed twice | $\sigma^2_{Char}$ | 2 |
| Same printer, same character, original and copy | $\sigma^2_{Copy}$ | 1 |
| One camera versus another, same character, page and printer | $\sigma^2_{Camera}$ | 1 |

Using the shape analysis software programs or metrics described above, the methods disclosed herein enable such workflows to be utilized on the deployment end (see FIG. 6), while overcoming the variance generally associated with such workflows and enabling deployed glyphs to be authenticated regardless of the workflow used. It is to be understood that when analyzing deployed glyphs, an appropriate workflow may be recognized for a particular application. For example, if the secure registry is authenticating a glyph assigned to an object with a given serial number, $\sigma^2_{Camera}$ is an important measurement for enabling the workflow. When the objective is to determine whether the glyph has been copied, $\sigma^2_{Copy}$ is an important measurement for enabling the workflow. Both workflows may be used to select metrics to run on the deployed glyph. In this example, if the $\sigma^2_{Camera} << \sigma^2_{Copy}$, the glyph can be authenticated with a high probability (i.e., in forensics, a high probability generally means there is less than 1 in a million, or less than 1 in a billion or more, chance of being wrong).

When generating the glyph for storing associated information in a registry, the workflow used is known, and thus a suitable analysis technique may be selected. Furthermore, as discussed immediately above, when the deployed glyph is analyzed, workflows may be identified, and thus suitable analysis technique(s) may be selected. As such, some of the analysis techniques may be pre-defined by the workflow used. However, it is to be understood that other suitable analysis techniques may be selected based upon what type(s) of glyph marks (e.g., satellites, porosities, edge properties, etc.) are available.

The small angle-sensitive, shape coding feature set (SCFS) may be used to determine the parameters when the character and/or graphic is printed using different printer models or is printed twice with the same printer model. In these examples, SCFS is sufficient for distinguishing the same character printed twice, either with the same printer model or a different printer model. It is to be understood that it may be desirable to analyze a large set of the same character and/or graphic in order to determine the population statistics for satellite location and type and/or porosity location for a given printer model. A large set may include any desirable number of the character and/or graphic that results in population statistics that enable probability values to be generated for that character and/or graphic. It may also be desirable to define the variability in a set of different characters printed using the same printer and compare this variability with the variability in measuring the exact same character twice, possibly with a different true resolution imaging device.

Figure 3A:
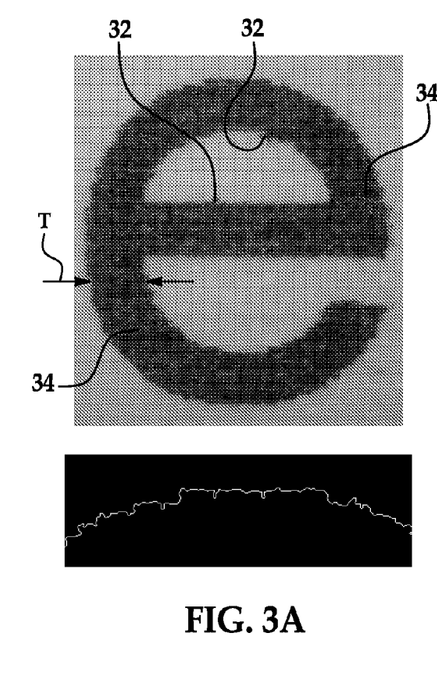
FIGS. 3A and 3B illustrate different characters of a glyph printed using thermal inkjet printers and captured using a 1:1 magnification, 3.8 micron true resolution Dyson relay lens-based 3 mega-pixel USB CMOS imaging device, and the corresponding results of the top of the respective images using forensic shape analysis software, respectively.
Figure 3B:
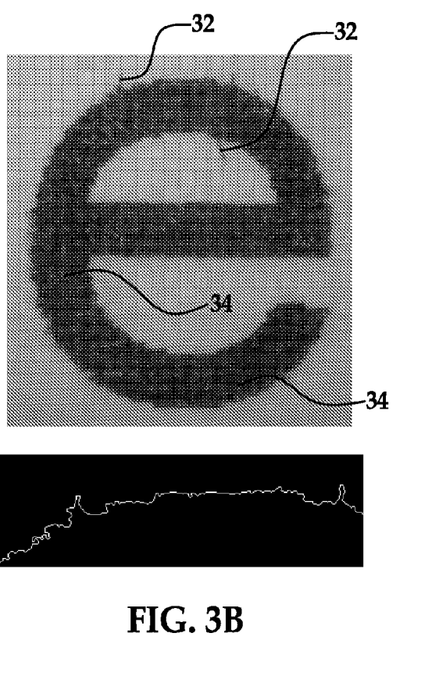
Figure 4A:
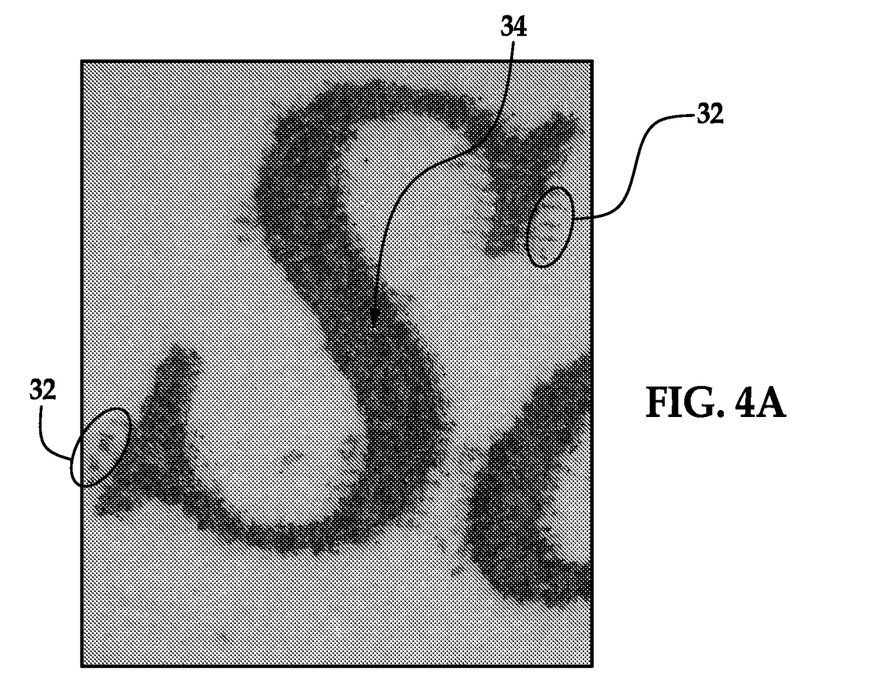
FIGS. 4A and 4B illustrate two distinct characters printed using thermal inkjet printers and captured using a 1:1 magnification, 3.8 micron true resolution Dyson relay lens-based 3 mega-pixel USB CMOS imaging device.
Figure 4B:
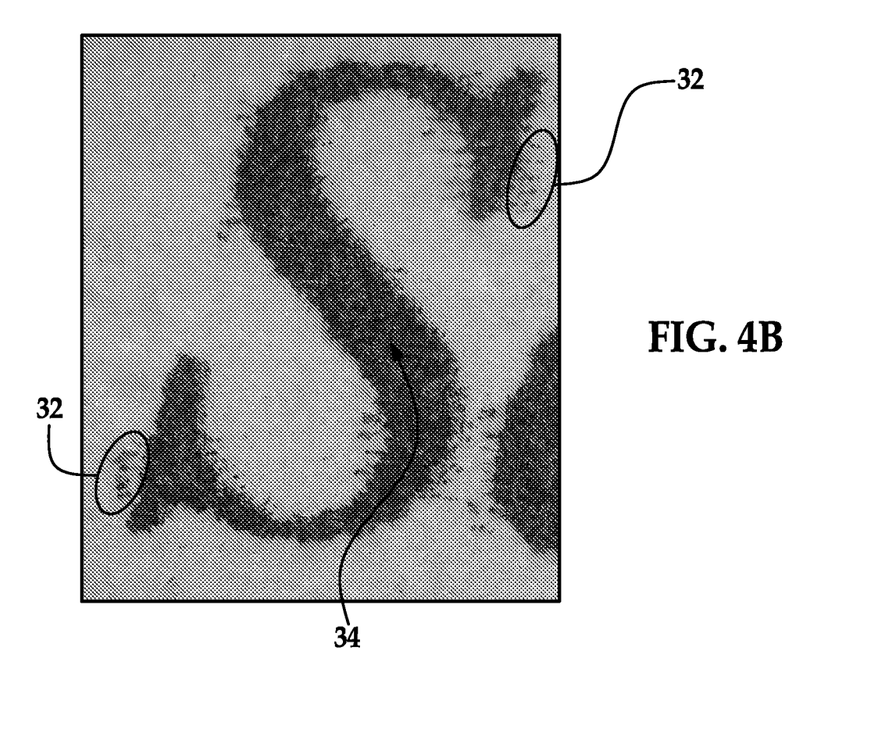

The third workflow in Table 1 is illustrated in FIGS. 3A and 3B and 4A and 4B, where the same character(s) is/are printed twice using the same exact printer. The image-to-image variance, $\sigma^2_{Char}$, is large enough that SCFS and MA-SCFS features are sufficient to distinguish between the respective two characters (e.g., the "e" in FIGS. 3A and 3B and the "S" in FIGS. 4A and 4B). These Figures illustrate satellites 32 and porosity 34 that result from the printing of the characters. The graphical representation of the top of each "e", resulting from the SCFS analysis, is also shown in FIGS. 3A and 3B. FIGS. 3A and 3B illustrate that the glyph-associated satellites 32 are readily computed/calculated as part of the glyph perimeter-generating process. FIGS. 4A and 4B illustrate that the relative locations of the satellites 32 are consistent for the same printer, but that the specific shapes of the individual satellites 32 may differ. Both of these sets of figures illustrate how print parasitics can group for a given printer, yet still differ from character/graphic to character/graphic.

The fourth workflow shown in Table 1 compares an original character to its copy. In general, $\sigma^2_{Copy} > \sigma^2_{Char}$, so the SCFS features allow for distinguishing between real and copied characters. A threshold for the ratio is determined based upon the SCFS analysis. When comparing deployed glyphs, the resulting ratio will be compared to the threshold stored in the registry to determine the probability of authenticity.

What is believed to be the most challenging workflow, workflow 5 in Table 1, requires the use of the ROSC metrics. The ROSC metrics allow different imaging devices 16 to be used on the same characters (thereby enabling distributed supply chain monitoring applications). For ROSC, $\sigma^2_{Camera} << \sigma^2_{Char} || \sigma^2_{Copy} || \sigma^2_{PSM} || \sigma^2_{PDM}$.

Referring back to FIG. 1, once analyzed, the glyph and, in some instances, the associated parameter(s), are stored in a secure registry, as shown at reference numeral 108. The secure registry includes at least a backend database (i.e., a remotely/securely accessible database not necessarily located at or near the site of image capture that may be accessed via https, ipsec, etc.). More specifically, the captured image of the printed character, graphic, and/or entire glyph is stored in the registry. It may be desirable to store the actual image for provenance, auditing, and/or evidence purposes. When the image is stored in the registry without the parameters, it is to be understood that when comparing a deployed glyph with the glyph on-file, parameters of each of the images may be analyzed and compared at the same time. In another embodiment, a list of parameters associated with the character, graphic, and/or entire glyph are stored in the registry (either with or without the image), and thus can be compared directly without reference to the image(s). The latter embodiment enables a relatively quick comparison to take place. As one example, the glyph may be "XYZ Corp.", and the parameters stored with the image of the glyph may include satellites, porosity, and/or shape descriptors identified for each of the letters X, Y, and Z.

The embodiments of the glyphs disclosed herein advantageously provide forensic-level security without the need for additional security deterrents. However, it is to be understood that additional security deterrents or other non-forensic identifying marks may be incorporated onto the object with the glyph, and in some instances, may be linked to the glyph in the secure registry. Linking the glyph to a non-forensic identifying mark enables one to use the content encoded in or visible on the mark as a search query when searching the secure registry database for authentication purposes. In some instances, this type of query simplifies the search of the database because the content is specifically linked to particular glyph(s), as opposed to searching image parameters that may be associated with multiple glyphs. Examples of such non-forensic identifying marks include any security feature with a unique number, such as, for example, watermarks, graphical alphanumerics, scrambled indicia, bar codes, serial numbers, or other unique identifying alphanumeric and/or graphic indicia that allow one to perform an indexed image-to-image comparison using the database.

After its generation and when desirable or appropriate, the generated glyph is deployed (i.e., printed) on an object. It is to be understood that the term "object" as used herein is to be interpreted broadly and may include, but is not limited to any type of object, product, document or package. Likewise, the term "package" is to be interpreted broadly herein to include any unit for containing a product, displaying a product, or otherwise identifying a branded good. Non-limitative examples of such packages include labels, anti-tamper strips (which tear when removal is attempted, thereby damaging both visual and physical aspects of any deterrents thereon), tickets, coupons, and other single-used items, boxes, bags, containers, clamshells, bands, tape, wraps, ties, bottles, vials, dispensers, inserts, other documents, or the like, or combinations thereof.

Figure 5:
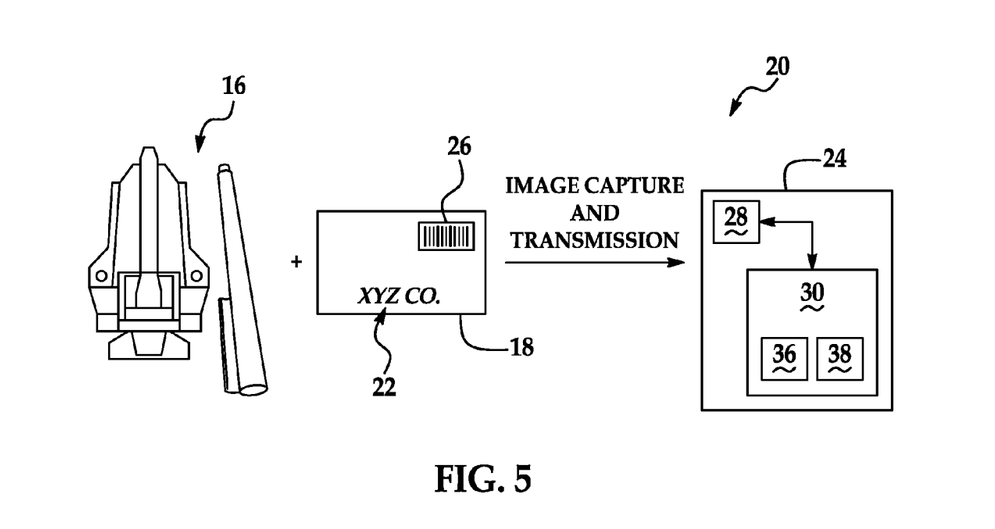
FIG. 5 is a schematic diagram of a system for individual glyph inspection.
Figure 6:
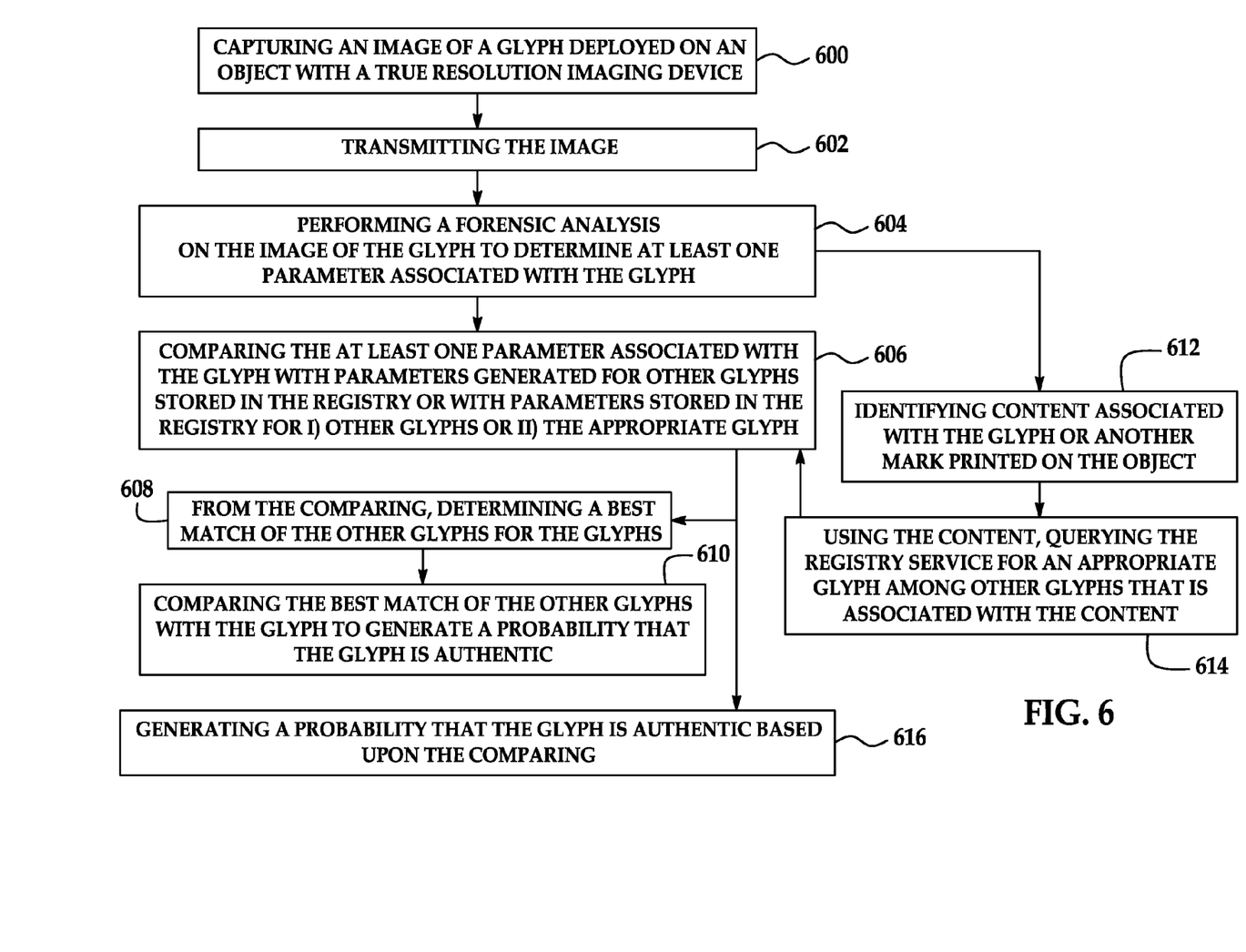
FIG. 6 is a flow diagram depicting embodiments of an individual glyph inspection method.

Once an object is deployed, it may be accessed, transmitted, and/or processed through a variety of channels, including inspection channels (e.g., at distribution nodes in a supply chain network), stocking and/or point-of-sale channels (e.g., at a retailer), and/or end consumer authentication channels (e.g., at or before point-of-sale, for recall testing, etc.). FIGS. 5 and 6 illustrate an embodiment of the system and embodiments of the method after the object has been deployed.

The system 20, shown in FIG. 5, generally includes the true resolution imaging device 16, the object 18 having the glyph 22 printed directly or indirectly thereon (i.e., printed on a surface of the object 18 itself, or on another substrate attached to the object 18), and the secure registry 24. Each of the components of the system 20 has been described hereinabove in reference to FIG. 1. As described hereinabove, the object 18 may also have printed thereon a non-forensic identifying mark 26. In one embodiment, the secure registry 24 includes the analysis system 30 and computer software 28 capable of receiving (from the imaging device 16) and transmitting (to the analysis system 30) the captured image of the glyph 22. In another embodiment, the registry/database 24 is remote to the device/system 30 performing the analysis, but is in selective operative communication therewith. As such, all of the system 20 components can be separate, even in cloud or distributed computing. In still another embodiment, an inspector may have the corporate registry 24 and the analysis program 30 on a mobile device, thus enabling him/her to use the system 10 without connection to another infrastructure.

FIG. 6 illustrates various embodiments of how the system 20 performs individual glyph inspection. As shown at reference numeral 600, the method(s) includes capturing an image of the glyph 22 that is deployed on the object 18 with a true resolution imaging device 16. When glyph 22 inspection is desirable, the captured image is transmitted to the analysis system 30 (whether it is located at the registry service 24 or is simply in selective and operative communication with the registry service 24), as shown at reference numeral 602. The transmission of the image may be accomplished in any desirable manner. For mobile (e.g., wireless) transmissions, the mode of transmission may depend upon the carrier privileges, the mobile connectivity, etc. The true resolution imaging device 16 could transfer, either directly or indirectly (e.g., via a cell phone) the image (and, in some instances other mark/ID(s) 26) to the analysis system 30. In another embodiment, the whole system 20 could reside on a single mobile platform (e.g., iPAQ®, iPhone®, etc.) and thus the transmission would be contained between the components of such a device. In embodiments in which the imaging device 16 and the analysis system 30 are part of the same system, the parameter(s) for the captured image may be analyzed and identified, and then the parameters (and, in some instances, other mark/ID(s) 26) may be transmitted to the registry 24.

The image is received via computer software 28 that is capable of receiving image. The software 28 is generally part of the analysis system 30, but may be located at the registry 24 (as shown in FIG. 5). This software 28 transmits the image to the image analysis program 36 of the analysis system 30, which performs forensic analysis on at least one character and/or graphic of the glyph image. Such forensic analysis includes the boundary analysis described hereinabove. This analysis will reveal one or more parameters (e.g., parasitics and/or a shape descriptor) of the character/graphic being analyzed. It is to be understood that the system 30 (or operator of the system 30) will determine which metric should be computed. In one embodiment, all metrics are part of the system 30 and will be computed. In another embodiment, some metrics are excluded because it is known that that such metrics were not valuable in the workflow used to generate the deployed glyph. For example, if the printing process/substrate interaction generates a specific type of parasitic shown in the image, then metrics suited to this parasitic could be selected and associated with this particular application. In still other instances, if the resources of the analysis system 30 are limited, those metrics that are available and/or those most likely to generate useful results will be computed.

Comparison between the parameters of the character(s)/graphic(s) of the image of the deployed glyph 22 and those of images of other glyphs previously stored in the registry 24 is performed (by an image comparison system 38 of the analysis system 30, which includes programs in operative communication with the registry database) to determine whether the deployed glyph is authentic or counterfeit. Such a comparison may be accomplished via two modes, both of which are shown in FIG. 6.

The first of the two modes is shown at reference numerals 606, 608, and 610 of FIG. 6. This embodiment of the method includes comparing the parameters identified for the glyph 22 with the entire registry of parameters previously stored for other glyphs. This initial comparison is a relative comparison and enables the determination of the best match among the previously stored parameters and/or glyphs. The best match resulting from the first comparison is generally the glyph image (which is stored in the registry or is associated with stored parameters) having the most parameters in common with the parameters of the image of the glyph 22. It is to be understood that if a single character and/or graphic of the glyph 22 is being analyzed, then the best match will have the same character and/or graphic with the highest number of corresponding parameters. It is likely that the best match will rarely, if ever, be an exact match, but it will have more parameters statistically in common with the parameters of the character(s)/graphic(s) of glyph 22 than the other stored glyphs. Since the comparison is based on statistics, any match will have a probability value associated therewith, and the highest probability value will be determined to be the best match.

It is to be understood that if an image ID (e.g., ID 26) is stored in the registry 24 and both the image and the corresponding parameters are also stored in the registry 24, a query using similar information from the object and glyph may be run to identify the best match. The probability that the glyph identified from the query is a match will be assessed, and from the assessment, a match or non-match reported.

Once the best match is identified, the parameters of the best match are compared with the parameters of the glyph 22 to generate the probability of authenticity of the deployed glyph 22. In a non-limiting example, the population of all images in a class is used to determine the expected value (typically in a Hamming distance) of the difference between any two images (i.e., the glyph 22 image and the image/parameters associated with an image stored in the registry 24). Then, the actual distance between any two images is compared to this expected value using Chi-square analysis.

In another embodiment, the best match may be determined by using the glyph image 22 itself to query the database of the registry 24 for other like previously stored images. This is an image-to-image comparison (as opposed to an initial parameter-to-parameter comparison) to determine the best match. When determining the best match in this manner, lower resolution refinement is used to hone in on the best matching images. As such, in this embodiment, rather than looking at all the images in the registry 24 at, for example, 3 micron true resolution, down-sampled versions of the images may be searched for faster refinement to the best possible matches. Such down-sampling may be particularly useful when other mark(s) 26 is/are not associated with the glyph 22 image, and thus are not available for use in searching the registry 24. It is to be understood, however, that when the other identifying mark(s) 26 are included on the object 18 with the glyph 22, such other marks(s) 26 may be used to narrow the query for this type of search of the registry 24. From the comparison, the image most closely resembling the glyph 22 image (i.e., the best match) is analyzed (by the system 30) to determine its parameters. The generated parameters of the stored image are then compared with the parameters of the glyph image 22 to generate the probability of authenticity of the deployed glyph 22 as described above.

The second of the two modes is shown at reference numerals 612, 614, 606 and 616 of FIG. 6. This embodiment of the method includes identifying the content associated with the deployed glyph 22 or with the mark 26 printed on the object 18. The non-forensic identifying mark 26 may be used to facilitate a search of the registry service 24. When a non-forensic identifying mark 26 is present on the object 18, the content/information of the mark 26 may be used as a search query for searching the registry service 24 for an appropriate glyph (among the glyphs stored in the registry 24) that is associated with the identified content. For example, if the mark 26 includes a serial number, the serial number may be used to search the database at the registry 24 for any glyphs associated with that serial number. This type of query generally results in an appropriate glyph to be compared with the image of the deployed glyph 22. The appropriate glyph is the stored glyph image that has been marked in the registry 24 as being linked to the content used for the query. Once the appropriate glyph is located, the parameters of the appropriate glyph are compared with the parameters of the glyph 22 to generate the probability of authenticity of the deployed glyph 22.

The boundary analysis software programs and metrics, in combination with the true resolution device 16, enable characters/graphics of images of deployed glyphs 22 to be analyzed, and such parameters are compared with stored parameters of authentic glyph images previously analyzed via similar methods. While the results of the analysis will likely vary, a statistical probability that the deployed glyph 22 is authentic is generated, an example of which is described hereinabove.

In some instances, details of the printer, cartridge, and/or substrate used to generate the original glyphs will be stored in the registry 24 with other parameter information. When the probability of authenticity is very high (which is based upon the Hamming distances described hereinabove), one may conclude that the printer used to generate the original stored glyph has also been used to generate the deployed glyph 22.

In any of the embodiments of the method disclosed in FIG. 6, it is to be understood that when the probability of authenticity of the analyzed glyph 22 image is high, a provenance record for the object 18 associated with the glyph 22 may be generated. Such a record is indicative of a trail of where the object 18 has been in the supply chain (e.g., since manufacturing, initial shipping, etc.). Such a record ties together any successful localizations of the image in the chain.

Any information resulting from the comparison (including the conclusion as to whether the glyph 22 and the associated object 18 are authentic or counterfeit) may be transmitted (via a secure connection) from the registry 24 to the user who initially transmitted the image of the glyph 22 (or some other authorized user).

While several embodiments have been described in detail, it will be apparent to those skilled in the art that the disclosed embodiments may be modified. Therefore, the foregoing description is to be considered exemplary rather than limiting.

What is claimed is:

1. A system for individual glyph inspection, comprising:
a printed glyph;
a true resolution imaging device configured to capture an image of the printed glyph;
a registry service including a database configured to store other glyphs, parameters of the other glyphs, or combinations thereof; and
an analysis system in selective communication with the registry service, the analysis system including:
computer software configured to receive the captured image; an image analysis program configured to perform a forensic analysis on the received image, the image analysis program including a metric to identify at least one parameter associated with the printed glyph, the at least one parameter being selected from an unintentional printed mark that appears outside or around a boundary of the printed glyph, an unintentional void inside the printed glyph, and combinations thereof; and
an image comparison program configured to i) compare the at least one parameter associated with the printed glyph with the parameters stored in the registry for the other glyphs or with parameters determined, by the image analysis program, for other glyphs stored in the registry, and ii) generate a probability that the printed glyph is authentic based upon the comparison.

2. The system as defined in claim 1 wherein the analysis system is further configured to identify an appropriate glyph for the comparison from the other glyphs using content associated with the printed glyph or content associated with a mark associated with the printed glyph.

3. The system as defined in claim 1 wherein the true resolution imaging device is a 1:1 magnification, 1 to 5 micron true resolution relay lens-based multi-mega-pixel USB CMOS imaging device.

4. The system as defined in claim 1 wherein the printed glyph includes an individual character or graphic.

5. A system for individual glyph inspection, comprising:
a true resolution imaging device configured to capture an image of a printed glyph;
a registry service including a database configured to store other glyphs, parameters of the other glyphs, or combinations thereof; and
an analysis system in selective communication with the registry service, the analysis system including:
computer software configured to receive the captured image;

an image analysis program configured to perform a forensic analysis on the received image to determine at least one parameter associated with the glyph; and an image comparison program configured to i) compare the at least one parameter associated with the glyph with the parameters stored in the registry for the other glyphs or with parameters determined, by the image analysis program, for other glyphs stored in the registry, and ii) generate a probability that the glyph is authentic based upon the comparison;

wherein the analysis system includes statistically comparable metrics including: a contrast-insensitive thresholding algorithm to binarize the image; a perimeter-pixel sequence generating algorithm to produce a high-resolution version of a modified Freeman shape code; a small angle-sensitive, shape coding feature set that is sensitive to relative changes in printed glyph radius, parasitics and parasitic complexity; two types of moving average representations of features of the small angle-sensitive shape coding feature set; multiple recursive overall shape comparison metrics; and optimal scaling and registration of the glyph with an other image and comparison of such other image.

6. An individual glyph inspection method, comprising:

receiving an image of a printed glyph deployed on an object, the image having been captured with a true resolution imaging device;

performing a forensic analysis on the image of the printed glyph by computing a metric on the image of the printed glyph to determine at least one parameter associated with the printed glyph, the at least one parameter being selected from an unintentional printed mark that appears outside or around a boundary of the printed glyph, an unintentional void inside the printed glyph, and combinations thereof;

comparing the at least one parameter associated with the printed glyph with parameters stored in a secure registry for other glyphs or with parameters determined for other glyphs stored in the registry; and generating a probability that the printed glyph is authentic based upon the comparing.

7. The method as defined in claim 6, further comprising generating a provenance record for the printed glyph based upon the comparing.

8. The method as defined in claim 6 wherein at least one of the parameters i) stored in the registry for at least one of the other glyphs or ii) determined for at least one of the other glyphs stored in the registry is generated by:

printing the at least one of the other glyphs;

capturing the at least one of the other glyphs with a true resolution imaging device; and analyzing the at least one of the other glyphs to determine the at least one of the parameters associated with the at least one of the other glyphs.

9. The method as defined in claim 6 wherein the boundary texture parameter includes satellites.

10. The method as defined in claim 6 wherein performing the analysis includes:

analyzing a region inside the boundary of the printed glyph for the unintentional void; and analyzing a region outside the boundary for the unintentional printed mark that appears outside or around the boundary of the printed glyph, the anomaly along the perimeter of the printed glyph that is classified by the particular shape, or combinations thereof.

11. The method as defined in claim 6, further comprising identifying a probability that a particular printer was used to print the printed glyph on the object prior to deployment, the identifying based on the comparison of the at least one parameter associated with the printed glyph with parameters stored in the registry for other glyphs.

12. The method as defined in claim 6 wherein prior to the comparing step, the method further comprises:

identifying content associated with the printed glyph or with a mark printed on the object;

using the identified content, querying the registry for an appropriate glyph among the other glyphs that is associated with the identified content; and wherein the comparing step includes comparing the at least one parameter associated with the printed glyph with parameters stored in the registry for the appropriate glyph.

13. The method as defined in claim 6 wherein the comparing results in a determination of a best match of the other glyphs for the printed glyph, and wherein the method further comprising comparing the best match of the other glyphs with the printed glyph to generate the probability.

14. An individual glyph generating method, comprising:

selecting at least one character or graphic for the glyph;

printing the at least one character or graphic;

capturing an image of the at least one character or graphic with a true resolution imaging device;

analyzing the image of the at least one character or graphic to determine at least one parameter associated with the at least one character or graphic, the at least one parameter being selected from a shape, a boundary texture, porosity, a modified shape descriptor, and combinations thereof, wherein the analyzing step includes computing a metric on the image of the at least one character or graphic to determine the at least one parameter, the metric being selected from a contrast-insensitive thresholding algorithm to binarize the image; a perimeter-pixel sequence generating algorithm to produce a high-resolution version of a modified Freeman shape code; a small angle-sensitive, shape coding feature set that is sensitive to relative changes in printed glyph radius, parasitics and parasitic complexity; two types of moving average representations of features of the small angle-sensitive shape coding feature set; multiple recursive overall shape comparison metrics; and optimal scaling and registration of the glyph with an other image and comparison of such other image; and storing, in a registry, the at least one character or graphic, the at least one parameter associated therewith, or combinations thereof.

15. The method as defined in claim 14, further comprising deploying the glyph on an object.

16. The method as defined in claim 6 wherein the metric is selected from a contrast-insensitive thresholding algorithm to binarize the image; a perimeter-pixel sequence generating algorithm to produce a high-resolution version of a modified Freeman shape code; a small angle-sensitive, shape coding feature set that is sensitive to relative changes in printed glyph radius, parasitics and parasitic complexity; two types of moving average representations of features of the small angle-sensitive shape coding feature set; multiple recursive overall shape comparison metrics; and optimal scaling and registration of the glyph with an other image and comparison of such other image.

* * * * *